(12) United States Patent
Jedeikin

(10) Patent No.: US 9,851,822 B2
(45) Date of Patent: Dec. 26, 2017

(54) METHODS AND SYSTEMS FOR SECURE TOUCH SCREEN INPUT

(71) Applicant: TradAir Ltd., Tel-Aviv (IL)

(72) Inventor: Ayal Jedeikin, Herzlia (IL)

(73) Assignee: TradAir Ltd., Tel-Aviv (IL)

(*) Notice: Subject to any disclaimer, the term of this patent is extended or adjusted under 35 U.S.C. 154(b) by 0 days.

(21) Appl. No.: 14/745,576

(22) Filed: Jun. 22, 2015

(65) Prior Publication Data
US 2015/0378460 A1    Dec. 31, 2015

Related U.S. Application Data

(60) Provisional application No. 62/018,614, filed on Jun. 29, 2014.

(51) Int. Cl.
*G06F 3/041* (2006.01)
*G06F 3/0488* (2013.01)

(52) U.S. Cl.
CPC ............ *G06F 3/041* (2013.01); *G06F 3/0488* (2013.01); *G06F 2203/04106* (2013.01); *G06F 2203/04808* (2013.01)

(58) Field of Classification Search
CPC .................. G06F 3/041; G06F 3/0488; G06F 2203/04106; G06F 2203/04808
USPC ......... 345/173–178, 619; 348/14.08; 463/10, 463/25, 42; 715/753
See application file for complete search history.

(56) References Cited

U.S. PATENT DOCUMENTS

| | | | | |
|---|---|---|---|---|
| 5,600,765 A | * | 2/1997 | Ando | G06F 3/038 345/668 |
| 6,556,222 B1 | * | 4/2003 | Narayanaswami | G04G 9/0064 368/295 |
| 8,379,874 B1 | * | 2/2013 | Simon | H04R 27/00 381/1 |
| 8,577,053 B1 | * | 11/2013 | Simon | H04R 3/005 381/77 |
| 2003/0038788 A1 | * | 2/2003 | Demartines | G06F 3/0485 345/173 |
| 2005/0249383 A1 | * | 11/2005 | Maritzen | G06F 21/32 382/115 |
| 2008/0026816 A1 | * | 1/2008 | Sammon | G07F 17/32 463/20 |

(Continued)

FOREIGN PATENT DOCUMENTS

| | | |
|---|---|---|
| EP | 2492790 | 8/2012 |
| WO | WO 2014/075121 | 5/2014 |

OTHER PUBLICATIONS

European Search Report and the European Search Opinion dated Oct. 22, 2015 From the European Patent Office Re. Application No. 15173185.8.

(Continued)

*Primary Examiner* — Prabodh M Dharia

(57) ABSTRACT

A method for secure touch screen input comprising: receiving from a touch screen an indication of a touch event on a predetermined enablement area on the touch screen; receiving from the touch screen an indication of a touch event on an interface element presented on the touch screen associated with a command; verifying that the interface element touch event occurs at an overlapping time with the enablement area touch event; and when the touch events occur at overlapping times, performing the command.

14 Claims, 1 Drawing Sheet

(56) References Cited

U.S. PATENT DOCUMENTS

| | | | | |
|---|---|---|---|---|
| 2011/0248822 A1* | 10/2011 | Sarihan | H04N 7/15 | 340/5.81 |
| 2012/0079282 A1* | 3/2012 | Lowenstein | G06F 21/83 | 713/189 |
| 2012/0146956 A1* | 6/2012 | Jenkinson | G06F 3/0418 | 345/178 |
| 2013/0169560 A1* | 7/2013 | Cederlund | G06F 3/013 | 345/173 |
| 2013/0268777 A1* | 10/2013 | Grobman | G06F 21/83 | 713/189 |
| 2014/0015773 A1* | 1/2014 | Loeffler | G06F 3/016 | 345/173 |
| 2014/0078086 A1* | 3/2014 | Bledsoe | G06F 3/041 | 345/173 |
| 2014/0218393 A1* | 8/2014 | Lee | G06F 3/0481 | 345/619 |
| 2014/0298257 A1* | 10/2014 | Grandhi | G06F 3/0484 | 715/808 |
| 2015/0130740 A1* | 5/2015 | Cederlund | G06F 3/014 | 345/173 |
| 2015/0160693 A1* | 6/2015 | Stotler | G06F 1/163 | 345/173 |
| 2015/0199067 A1* | 7/2015 | Kim | G06F 1/1626 | 345/173 |
| 2015/0363015 A1* | 12/2015 | Jagtman | G06F 3/041 | 345/173 |
| 2015/0378503 A1* | 12/2015 | Seo | G06F 1/1641 | 345/173 |
| 2016/0026425 A1* | 1/2016 | Lee | G06F 3/0416 | 345/2.2 |
| 2016/0109961 A1* | 4/2016 | Parshionikar | G06F 3/013 | 345/156 |

OTHER PUBLICATIONS

Communication Pursuant to Article 94(3) EPC dated May 24, 2017 From the European Patent Office Re. Application No. 15173185.8.

* cited by examiner

METHODS AND SYSTEMS FOR SECURE TOUCH SCREEN INPUT

RELATED APPLICATION

This application claims the benefit of priority under 35 USC 119(e) of U.S. Provisional Patent Application No. 62/018,614 filed on Jun. 29, 2014, the contents of which are incorporated herein by reference in their entirety.

FIELD AND BACKGROUND OF THE INVENTION

The present invention, in some embodiments thereof, relates to secure input and, more particularly, but not exclusively, to secure touch screen input.

Most banks, securities firms and brokerage houses require traders to submit orders and or execute trades on a variety of trading platforms, using designated keyboards.

This action may be done on touch screen type interfaces.

SUMMARY OF THE INVENTION

According to an aspect of some embodiments of the present invention there is provided a method for secure touch screen input comprising: receiving from a touch screen an indication of a touch event on a predetermined enablement area on the touch screen; receiving from the touch screen an indication of a touch event on an interface element presented on the touch screen associated with a command; verifying that the interface element touch event occurs at an overlapping time with the enablement area touch event; and when the touch events occur at overlapping times, performing the command.

Optionally, the enablement area is determined by the user.

Optionally, the enablement area comprises a plurality of separate areas on the touch screen.

Optionally, when the touch events do not occur at overlapping times, performing a second command associated with the interface element.

Optionally, the interface element is one of a plurality of interface elements presented on the touch screen, each associated with a command.

Optionally, the method further comprises, after the receiving indication of the enablement area touch event: changing the presentation of at least one of the interface element and the enablement area on the touch screen, to indicate that a touch on the interface element causes performing of the command.

Optionally, the method further comprises, after the performing of the command: changing the presentation of at least one of the interface element and the enablement area on the touch screen, to indicate that the command is performed.

According to some embodiments of the present invention there is provided a computer readable medium comprising computer executable instructions adapted to perform the method of claim 1.

According to an aspect of some embodiments of the present invention there is provided a system for secure touch screen input, comprising: a touch screen identifying touch events of a user; at least one interface element presented on the touch screen associated with a command; a predetermined enablement area on the touch screen; a processor performing the command after receiving from the touch screen an indication of a touch event on the enablement area and a touch event on the at least one interface element that occurs at an overlapping time.

Optionally, the system further comprises at least one simple interface element presented on the touch screen associated with a second command; wherein the second command is performed by the processor after receiving from the touch screen an indication of a touch event on the simple interface element.

Optionally, the touch screen is connected to a computer and the system is used as a keyboard in for the computer.

According to an aspect of some embodiments of the present invention there is provided a computer program product for secure touch screen input, comprising: a computer readable storage medium having stored thereon: first program instructions executable by a processor to cause the processor to defining an enablement area on a touch screen; second program instructions executable by the processor to cause the processor to receive from the touch screen an indication of a touch event on a the enablement area; third program instructions executable by the processor to cause the processor to receive from the touch screen an indication of a touch event on an interface element presented on the touch screen associated with a command; forth program instructions executable by the processor to cause the processor to verify that the interface element touch event occurs at an overlapping time with the enablement area touch event; and fifth program instructions executable by the processor to cause the processor to perform the command when the touch events are occur at overlapping times.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
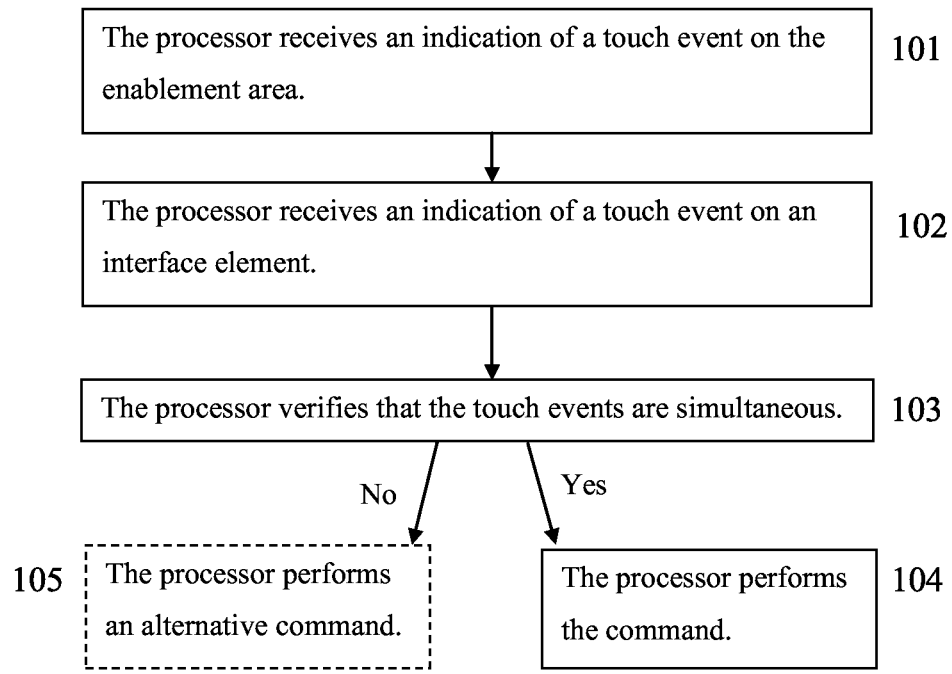
FIG. 1 is a flowchart schematically representing a method for secure touch screen input, according to some embodiments of the present invention.

The present invention, in some embodiments thereof, relates to secure input and, more particularly, but not exclusively, to secure touch screen input.

Touch screens may be very sensitive to touch events. Therefore, erroneous touches by a user may regularly occur when using a touch screen. Also, issuing a command on a touch screen requires only one touch action, compared to regular computer commands requiring at least two actions of moving a pointer and clicking.

For some applications, where commands received by the touch screen are critical, such erroneous touches may result in unwanted critical errors with serious consequences. For example, an error by traders that execute orders or trades may result in loss of money. Other examples of potentially critical errors are military orders during battle that are issued using a touch screen, medical equipment operated by a touch screen and/or any other use of which commands are critical and/or difficult to reverse.

According to some embodiments of the present invention, a method exists for a secure touch screen input. A processor receives from a touch screen an indication of a touch event on a predetermined enablement area on the said touch screen. The processor also receives an indication of a touch event on an interface element on the touch screen associated with a command. The processor then verifies that the touch events occur at overlapping times, and when they do occur at overlapping times, the processor performs the command.

This double touch mechanism minimizes the possibility of commands performed by erroneous touches, as accidental touch of a user on both the enablement area and an interface element simultaneously is an unlikely event.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
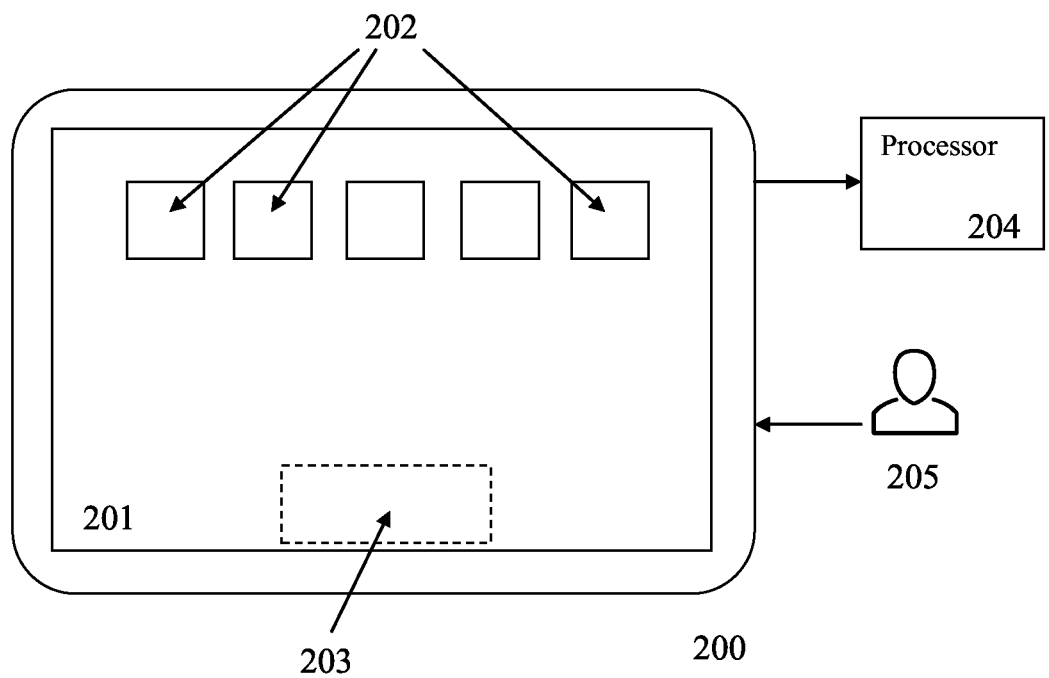
FIG. 2 is a schematic illustration of a system for secure touch screen input, according to some embodiments of the present invention.

Referring now to the drawings, FIG. 1 is a flowchart schematically representing a method for secure touch screen input, according to some embodiments of the present invention. The method may be coded in a computer program, for example, a computer program installed on a personal computer and/or a laptop computer, an application installed on a tablet computer and/or a mobile phone and/or any other software and/or hardware. Reference is also made to FIG. 2 which is a schematic illustration of a system for secure touch screen input, according to some embodiments of the present invention.

System 200 includes a touch screen 201 that identifies touch events of a user 205. Touch screen 201 may be of any type, size and/or resolution. Touch screen 201 may be integrated in any physical device, for example, a tablet computer, a laptop computer, a mobile phone and/or any other device.

Interface elements 202 are presented on touch screen 201, each associated with a command. Interface elements 202 may be, for example, buttons, menus, switches, checkboxes, textboxes, widgets, compositions of such elements and/or any other type of layout element. The command may be of any computerized action according to the application system 200 is used for, for example, in trading the actions may be buying and/or selling of stocks.

Touch screen 201 includes a predetermined enablement area 203. Enablement area 203 may be of any size, shape and/or position. For example, enablement area 203 may be a rectangle positioned at the bottom of touch screen 201, a circle on the middle of touch screen 201 or a square positioned in a corner of touch screen 201.

Optionally, enablement area 203 includes multiple separate areas on touch screen 201. For example, enablement area 203 may include two rectangles each positioned at a different side of touch screen 201.

Optionally, enablement area 203 may be shown on touch screen 201, for example, by color, lines, icon and/or any other mark. Optionally, the size, shape, division, marking and/or any other parameter of enablement area 203 is determined by user 205.

System 200 includes a processor 204 that receives indication of touch events from touch screen 201 and performs required commands. Processor 204 may be any hardware unit capable of processing digital commands, for example, a computer processor.

Processor 204 may be integrated in the same physical device as touch screen 201 or may be integrated in a remote device. Touch screen 201 then communicates with processor 204, for example, by a network such as the local area network (LAN), wireless local area network (WLAN), cellular network and/or any other kind of communication.

First, as shown at 101, processor 204 receives from touch screen 201 an indication of a touch event on enablement area 203. The indication includes the time of the touch event. The touch event may be caused by a touch of user 205 on any part of enablement area 203. The touch may be, for example, tap, swipe and/or any other gesture.

Optionally, the size, shape, color and/or any other parameter of any of interface elements 202 and/or enablement area 203 is changed when enablement area 203 is touched to indicate that a touch in any of them will cause the associated command to be performed. For example, in trade functionality, when enablement area 203 is touched, the interface elements for buying and selling are changed to bright color.

Then, as shown at 102, processor 204 receives from touch screen 201 an indication of a touch event on one of interface elements 202. The touch may be any gesture, as described above.

Then, as shown at 103, processor 204 verifies that the interface element touch event occurs at an overlapping time with the enablement area touch event. Optionally, processor 204 also verifies that the enablement area touch event is continues and started before and/or simultaneous with the interface element touch event.

Then, as shown at 104, when the touch events occur at overlapping times, processor 204 performs the command associated with the touched interface element 202. Optionally, the command is performed only if the enablement area touch event is continues and started before and/or simultaneous with the interface element touch event.

Optionally, the size, shape, color and/or any other parameter of the touched interface element 202 is changed when the associated command is performed. For example, the interface element is blinking once for confirmation.

Optionally, only some of the actions associated with interface elements 202 require enablement area touch to be performed. Optionally, interface elements requiring enablement are presented differently on touch screen 201 from interface elements not requiring enablement. For example, interface elements requiring enablement are presented in a different color and/or having a lock icon.

Optionally, as shown at 104, when the touch events do not occur at overlapping times, processor 204 performs an alternative command associated with the touched interface element 202. For example, the alternative command is providing information to user 205 on touch screen 201, asking user 205 to confirm the original command and/or any other command.

Optionally, system 200 is used as a keyboard in for a computer. Some commands by the computer are performed only when user 205 touches enablement area 203 and one of interface elements 202 at overlapping times. Optionally, actions made on the computer affect the information and interface element 203 that are presented on touch screen 201. The computer may include a main screen that presents information corresponding to the information and interface elements 202 that are presented on touch screen 201. For example, selecting a different object on the main screen changes the interface elements presented on touch screen 201. System 200 is integrated in the computer, for example, so processor 204 is the processor of the computer.

In an exemplary scenario, a broker is using the system to perform trade actions. The system is connected to a main trading computer. The interface elements associated with buying and selling are presented as numbers indicating prices. While holding the touch screen, the broker accidentally touches one of the numbers associated with a sale, however, the sale is not performed. Then, the broker decides to make a buy, so he touches an enablement area presented on each side of the touch screen. The numbers indicating prices are highlighted, and the broker also touches the number associated with a desired buy. The buy is then performed by the processor located on the main trading computer.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant touch screens will be developed and the scope of the term touch screen is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for preventing undesired trading transactions from a handheld device having a touch screen comprising:
   receiving from a touch screen an indication of a touch event on a predetermined enablement area on said touch screen;
   upon said receiving, changing at least one presentation attribute of an interface element presented on said touch screen to indicate to a user of said touch screen, an availability of said interface element to initiate an online trading transaction command associated with said interface element;
   receiving from said touch screen an indication of a touch event on said interface element;
   verifying that said enablement area touch event starts before said interface element touch event and is continuous during said interface element touch event and that said interface element touch event occurs at an overlapping time with said enablement area touch event; and
   when said enablement area touch event starts before said interface element touch event and is continuous during said interface element touch event and that said touch events occur at overlapping times, transmitting said command to be executed by a trading computer.

2. The method of claim 1, wherein said enablement area is determined by said user.

3. The method of claim 1, wherein said enablement area comprises a plurality of separate areas on said touch screen.

4. The method of claim 1, wherein when said touch events do not occur at overlapping times, performing a second command associated with said interface element.

5. The method of claim 1, wherein said interface element is one of a plurality of interface elements presented on said touch screen, each associated with a command.

6. The method of claim 1, further comprising upon said receiving said indication of said enablement area touch event:
   changing a presentation of said enablement area on said touch screen.

7. The method of claim 1, further comprising after said transmitting of said command:
   changing the presentation of at least one of said interface element and said enablement area on said touch screen, to indicate that said command is transmitted.

8. A computer readable medium comprising computer executable instructions adapted to perform the method of claim 1.

9. The method of claim 1, wherein said enablement area touch event is caused by a touch of a type of swiping.

10. A system for preventing undesired trading transactions from a handheld device having a touch screen, comprising:
    a touch screen identifying touch events of a user;
    at least one interface element presented on said touch screen associated with an online trading transaction command;
    a predetermined enablement area on said touch screen;
    a processor transmitting said command to be executed by a trading computer, after receiving from said touch screen an indication of a touch event on said enablement area, changing at least one presentation attribute of said at least one interface element upon said indication of said touch event on said enablement area to indicate to said user an availability of said interface element to initiate said online trading transaction, after receiving a touch event on said at least one interface element, and after verifying that said enablement area touch event starts before said at least one interface element touch event and is continuous during said at least one interface element touch event, and that said touch events occur at an overlapping time.

11. The system of claim 10, further comprising at least one simple interface element presented on said touch screen associated with a second command; wherein said second command is performed by said processor after receiving from said touch screen an indication of a touch event on said simple interface element.

12. The system of claim 11, wherein a presentation appearance of said at least one simple interface element is different than a presentation appearance of said at least one interface element.

13. The system of claim 10, wherein said touch screen is connected to a computer and said system is used as a keyboard in for said computer.

14. A computer program product for preventing undesired trading transactions from a handheld device having a touch screen, comprising:
    a computer readable storage medium having stored thereon:
    first program instructions executable by a processor to cause said processor to define an enablement area on a touch screen;
    second program instructions executable by said processor to cause said processor to receive from said touch screen an indication of a touch event on a said enablement area;
    third program instructions executable by said processor to cause said processor to change, upon said receiving, at least one presentation attribute of an interface element presented on said touch screen to indicate to a user of said touch screen, an availability of said interface element to initiate an online trading transaction command associated with said interface element;
    fourth program instructions executable by said processor to cause said processor to receive from said touch screen an indication of a touch event on said interface element;
    fifth program instructions executable by said processor to cause said processor to verify that said enablement area touch event starts before said interface element touch event and is continuous during said interface element touch event, and that said interface element touch event occurs at an overlapping time with said enablement area touch event; and sixth program instructions executable by said processor to cause said processor to transmit said command to be executed by a trading computer when said enablement area touch event starts before said interface element touch event and is continuous during said interface element touch event and that said touch events occur at overlapping times.

\* \* \* \* \*